US012698815B2

(12) United States Patent
    Lee

(10) Patent No.: US 12,698,815 B2
(45) Date of Patent: Aug. 4, 2026

(54) RESILIENT MEMBER FOR GUIDING SMOOTH PUMPING OF PUMPING APPARATUS, AND PUMPING APPARATUS COMPRISING SAME

(71) Applicant: Seung Bae, Seoul (KR)

(72) Inventor: Jae Hwan Lee, Seoul (KR)

(73) Assignee: Seung Bae, Seoul (KR)

( * ) Notice: Subject to any disclaimer, the term of this patent is extended or adjusted under 35 U.S.C. 154(b) by 190 days.

(21) Appl. No.: 18/686,432

(22) PCT Filed: Aug. 8, 2022

(86) PCT No.: PCT/KR2022/011780
    § 371 (c)(1),
    (2) Date: Feb. 26, 2024

(87) PCT Pub. No.: WO2023/027383
    PCT Pub. Date: Mar. 2, 2023

(65) Prior Publication Data
    US 2024/0369119 A1      Nov. 7, 2024

(30) Foreign Application Priority Data
    Aug. 26, 2021    (KR) ........................ 10-2021-0113507

(51) Int. Cl.
    *F16F 3/087*         (2006.01)
    *B05B 12/00*         (2018.01)
(52) U.S. Cl.
    CPC ........ *F16F 3/0873* (2013.01); *B05B 12/0022* (2018.08); *F16F 2224/02* (2013.01)
(58) Field of Classification Search
    CPC ...... F16F 3/0873; F16F 2224/02; F16F 1/373; F16F 1/377; B05B 12/0022; B05B 11/1073; B05B 11/1025; B05B 11/1077

USPC ....... 222/385, 383.1; 267/153, 180; 264/299
See application file for complete search history.

(56) References Cited

U.S. PATENT DOCUMENTS

| 6,068,250 A * | 5/2000 | Hawkins ................. F16F 1/328 |
| | | 267/164 |
| 11,612,903 B2* | 3/2023 | Goettke .............. B05B 11/1077 |
| | | 222/401 |
| 2015/0090741 A1* | 4/2015 | Laffey ................... F16F 3/0876 |
| | | 222/321.9 |

FOREIGN PATENT DOCUMENTS

| CN | 106794924 A * | 5/2017 | ........... B05B 11/106 |
| JP | 1997-057158 A | 3/1997 | |
| JP | H1047400 A * | 2/1998 | ........ B05B 11/3077 |
| KR | 10-2002-0035811 A | 5/2002 | |

(Continued)

OTHER PUBLICATIONS

Translation: JP-H1047400-A (Year: 1998).*

(Continued)

*Primary Examiner* — David P Angwin
*Assistant Examiner* — Christopher S. Parisi
(74) *Attorney, Agent, or Firm* — Nicholas Park

(57) ABSTRACT

According to the elastic member of the present invention, specific structures of the lower support portion, the first resilient portion, the second resilient portion, the elastic structure forming unit and the upper support portion are provided so that pumping operation of a pumping device can be smoothly induced; a flow of fluid flowing according to the pumping operation can be induced in one direction; the resilient restoring force is not changed according to use so as to ensure a predetermined pumping discharge amount of the pumping device.

4 Claims, 14 Drawing Sheets

(56) References Cited

FOREIGN PATENT DOCUMENTS

| KR | 20-0306872 Y1 | 3/2003 | |
| KR | 10-2016-0097607 A | 8/2016 | |
| KR | 10-2116648 B1 | 5/2020 | |
| KR | 10-2021-0094429 A | 7/2021 | |
| KR | 20210094429 A * | 7/2021 | ......... B05B 11/1074 |

OTHER PUBLICATIONS

Translation: CN-106794924-A (Year: 2017).*
Translation: KR-20210094429-A (Year: 2021).*
KIPO, Office Action issued in Korean application No. 10-2021-0113507, Oct. 14, 2021, 5 pages.
KIPO, Decision to Grant a Patent for Korean Patent Application No. 10-2021-0113507, Dec. 17, 2021, 2 pages.
WIPO, International Search Report and Written Opinion for International Application No. PCT/KR2022/011780, Sep. 27, 2022, 12 pages.

* cited by examiner

1

RESILIENT MEMBER FOR GUIDING SMOOTH PUMPING OF PUMPING APPARATUS, AND PUMPING APPARATUS COMPRISING SAME

CROSS-REFERENCE TO RELATED APPLICATION

This application is a National Phase entry of International Application No. PCT/KR2022/011780, filed on Aug. 8, 2022, which claims priority to Korean Patent Application No. 10-2021-0113507, filed on Aug. 26, 2021, based on the priority of the above patent, in the Korean Intellectual Property Office, the disclosures of each of which are incorporated herein by reference.

BACKGROUND

Field of the Invention

The present invention relates to an elastic member and a pumping device including the same, and more particularly, to an elastic member having a structure capable of smoothly inducing pumping of a pumping device, and the pumping device including the same.

Description of the Related Art

In general, a content dispensing device is coupled to an opening of a container so that liquid or gel cosmetics can be discharged and used from the container.

As described above, the reason why the discharge device is installed at the opening of the container is that the contents can be discharged and used only as much as necessary, an appropriate amount may be used to thus reduce waste of cosmetics, and economical burden due to frequent purchase and use of cosmetics can be reduced.

As described above, the discharge device enabling the content to be discharged and used in desired amount is configured such that: when pressing a head connected to a piston of a pump body, a check-valve at a suction port of a cylinder blocks the suction port by a repulsive force of a spring to thus inhibit the contents put inside the cylinder from flowing backward to the container and, at the same time, discharges the contents in the cylinder through the head after passing through a transfer-path of the piston by pressure; and, when the pressure applied to the head is released and the piston moves upward by the repulsive force of the spring, the check-valve blocking the suction port of the cylinder is separated from the suction port and the contents in the container flow into the cylinder again, whereby the contents can be discharged and used by continuous pumping operation.

As shown in FIG. 1, since the conventional discharge device capable of discharging and using the contents as described above, is provided with a metal spring inside the cylinder in which the contents are present, there is a risk that the contents may react chemically with the spring and be deteriorated.

As described above, a content discharge device for preventing deterioration (chemical reaction) of cosmetics by a spring has been registered as Utility Model Registration No. 306872.

The above discharge device disclosed in Utility Model Registration No. 306872 prevents the spring from contacting the contents of cosmetics, but the spring is interposed between a pump body and a head connected to the top of a piston of the pump body, therefore, it has a disadvantage of increasing the number of assembly workers required for assembling and manufacturing the discharge device. Further, the spring is managed as a separate part and has many disadvantages in terms of loss during storage and transportation.

Therefore, there is a need for a technique capable of solving the above-mentioned problems according to the prior art.

SUMMARY

Technical Problem

An object of the present invention is to provide an elastic member having a structure that can smoothly induce a pumping operation of a pumping device, may induce a flow of fluid flowing in accordance with the pumping operation in one direction, can ensure a predetermined pumping discharge amount of the pumping device since an elastic restoring force is not altered according to use, and can prevent contamination of liquid cosmetics by contacting the liquid cosmetics, as well as a pumping device including the same.

Technical Solution

In order to accomplish the above object, the elastic member according to one aspect of the present invention may have a configuration including: a lower support portion in a ring structure having predetermined sizes of outer diameter and thickness from a plane view, which is made of a material having a predetermined resilient restoring force; a first resilient portion integrally bound to the lower support portion or one side of a second resilient portion, the binding being implemented to have a bottom surface that forms a predetermined acute angle with the lower support portion or a top surface of the second resilient portion, which has a ring structure with the same outer diameter and thickness as the lower support portion from the plane view, and is made of a material having a predetermined resilient restoring force; the second resilient portion integrally bound to the other side of the first resilient portion wherein a binding position to the other side of the first resilient portion is in a direction at the opposite side of a position where the lower support portion and the first resilient portion are bound to each other from the plane view, the binding being implemented to have a bottom surface that forms a predetermined acute angle with the top surface of the first resilient portion, which has a ring structure with the same outer diameter and thickness as the first resilient portion from the plane view, and is made of a material having a predetermined resilient restoring force; an elastic structure forming unit in which the first resilient portions and the second resilient portions are continuously and alternately bound to form a single elastic binding structure; and an upper support portion integrally bound to one side or the other side of an uppermost component among the first resilient portions and the second resilient portions that form the elastic structure forming unit, the binding being implemented to have a bottom surface that forms a predetermined acute angle with a top surface of the uppermost component, which has a ring structure with the same outer diameter and thickness as the lower support portion from the plane view, and is made of a material having a predetermined resilient restoring force.

In one embodiment of the present invention, the lower support portion and the upper support portion may be composed of a plastic material (PP, polypropylene) having a predetermined resilient restoring force, respectively.

In one embodiment of the present invention, the lower support portion and the upper support portion may be configured to form a predetermined angle with a mounting surface on which these are mounted, or may be configured parallel to the mounting surface on which these are mounted.

In one embodiment of the present invention, a vertical cross-sectional structure of the lower support portion may be a polygonal structure combined with vertical and horizontal lines, and a thickness T1 in a height direction on a longitudinal cross-section of the lower support portion may be a length of 10 to 20% compared to the outer diameter (OD), while a width D1 of each of one side and the other side on the longitudinal cross-section of the lower support portion may be a length of 10 to 20% compared to the outer diameter (OD). Further, a thickness T2 in a height direction of the binding part where the one side of the lower support portion and the first resilient portion are bound to each other may be a length of 150 to 180% compared to the thickness T1 in the height direction on the longitudinal cross-section of the lower support portion, while a width D2 in the height direction of the binding part where the one side of the lower support portion and the first resilient portion are bound to each other may be a length of 80 to 100% compared to the thickness T1 in the height direction on the longitudinal cross-section of the lower support portion.

In this case, the thickness in the height direction on the longitudinal cross-section of each of the first resilient portion, the second resilient portion and the upper support portion, the width of each of one side and the other side on the longitudinal cross-section, the thickness in the height direction of the part bound to another component, and the width of the part bound to another component, respectively, are preferably the same as those of the lower support portion.

In one embodiment of the present invention, the elastic member may include: a lower support protrusion which is formed to protrude laterally by a predetermined length from one end of the lower support portion, and is configured to form a vertical side structure parallel to a side surface of the first resilient portion and a side surface of the second resilient portion in a state that no compressive force is applied to the elastic member; and an upper support protrusion which is formed to protrude laterally by a predetermined length from one end of the upper support portion, and is configured to form a vertical side structure parallel to the side surface of the first resilient portion and the side surface of the second resilient portion in a state that no compressive force is applied to the elastic member.

In one embodiment of the present invention, the elastic member may further include an auxiliary elastic member with a configuration in that the auxiliary elastic member is mounted in an inner space of the elastic structure forming unit, and is compressed in conjunction with the compression of the elastic member to fill the inner space of the elastic member.

In this case, the auxiliary elastic member may include: a lower mounting portion with an annular structure having the same outer diameter as an inner circumferential surface of the lower support portion and being provided with a through-hole formed in the central portion; a curved surface forming part, which is formed to protrude upward by a predetermined height from the lower mounting portion, forms a curved structure in the form of screw that rotates about a vertical center axis of the lower mounting portion and continuously twists and goes upward, and is made of a material having a predetermined resilient restoring force; and an upper mounting portion that is formed as an integral structure at an upper end of the curved surface forming part, extends upward by a predetermined height, and has a concave-convex structure formed on the top surface thereof.

Further, an outer circumferential surface of the curved surface forming part in the auxiliary elastic member may have a vertical side structure parallel to the inner circumferential surfaces of the first resilient portion and the second resilient portion.

The present invention may also provide a cosmetic container pump including the elastic member, the cosmetic container pump according to one aspect of the present invention may include: a head bound to an upper end of a shaft, which is provided with a discharge passage for discharging liquid cosmetics supplied via a flow-path of the shaft to the outside; the shaft in which the flow-path is formed at an inner center thereof, the elastic member top fixing groove is formed to surround an upper outer circumferential surface of the flow-path, and a head fastening part is formed at the upper end while a stem fastening part is formed at the lower end, and the shaft being driven to slid up and down along the inside of a binding cylinder when a user presses the head; a chaplet in a cylindrical structure that surrounds the outer circumferential surface of the shaft, is provided with the elastic member bottom fixing groove formed to surround a lower outer circumferential surface of the flow-path of the shaft, and has a cylinder fastening part formed at an upper end thereof to be bound to the upper end of the binding cylinder; a stem mounted on the lower end of the shaft in a structure communicating with the flow-path; and the binding cylinder in a cylindrical structure that is bound to the cylinder fastening part of the chaplet, is formed with a space, in which the shaft can be driven to slide up and down, and is provided with a flange structure at the top thereof, in which a cover bound to an inlet of the cosmetic container is positioned.

In one embodiment of the present invention, a suction port may be formed at the bottom of the binding cylinder to suck liquid cosmetics stored in the cosmetic container, and the suction port may be provided with a plate-shaped opening/closing member ("switch member") in a valve structure to open or close the suction port by a pressure difference inside the flow-path formed according to vertical sliding drive of the shaft.

Effect of Invention

As described above, according to the elastic member of the present invention, specific structures of the lower support portion, the first resilient portion, the second resilient portion, the elastic structure forming unit and the upper support portion are provided so that pumping operation of a pumping device can be smoothly induced; a flow of fluid flowing according to the pumping operation can be induced in one direction; the resilient restoring force is not changed according to use so as to ensure a predetermined pumping discharge amount of the pumping device.

Further, according to the elastic member of the present invention, the first resilient portion, the second resilient portion, and the upper support part are all made of plastic (PP, Polypropylene) material, therefore, it is possible to provide an elastic member capable of basically blocking contamination caused by metal corrosion of cosmetics when a metal material is in direct contact with the cosmetics applied to the human skin. Furthermore, the elastic member may be applied to food treatment devices such as food processing devices and food packaging devices, and may basically block food contamination to thus implement hygienic food processing, whereby an elastic member capable of fundamentally solving the problems of prior art due to the use of a metal elastic member can be provided.

Further, according to the elastic member of the present invention, the thickness and width of each of the lower support portion, the first resilient portion, the second resilient portion and the upper support portion on the longitudinal cross-section, and the thickness and width of a part bound to other components in the height direction may be defined organically in specific ranges based on the planar outer diameter (OD) of the lower support portion, whereby it is possible to provide an elastic member that can secure structural stability and, at the same time, apply a resilient restoring force in a predetermined extent or more.

Further, according to the elastic member of the present invention, a lower support protrusion and an upper support protrusion in specific structures may be formed at specific positions, so that these support protrusions can be stably disposed on the top and bottom surfaces where the elastic member is mounted, and can prevent the elastic member from rotating in place by unintended external force, whereby it is possible to provide an elastic member that can stably provide a resilient restoring force against head pressing operation by a user.

Further, according to the cosmetic container pump equipped with the elastic member of the present invention, an auxiliary elastic member including a lower mounting portion, a curved surface forming part, and an upper mounting portion in specific structures may be provided, and the auxiliary elastic member may be compressed downward while rapidly reducing an inner space of the head, simultaneously, according to the head pressing operation by the user, so that the cosmetics filled in an inner space of the auxiliary elastic member inside the inner space of the head can be discharged to the outside. Therefore, it is possible to provide a cosmetic container pump capable of providing a more increased pumping amount compared to the prior art even though pumping is carried out at the same stroke length as the pumping stroke length according to the prior art.

In addition, according to the cosmetic container pump equipped with the elastic member of the present invention, a plate-shaped switch member in a specific valve structure may be mounted to open or close a suction port, so that it is possible to provide a cosmetic container pump capable of basically preventing the flow of liquid cosmetics due to unintended movement of beads in the cosmetic container pump equipped with a bead-shaped switch member according to the prior art.

BRIEF DESCRIPTION OF THE DRAWINGS

The above and other objects, features and other advantages of the present invention will be more clearly understood from the following detailed description taken in conjunction with the accompanying drawings, in which.

6

Figure 5:
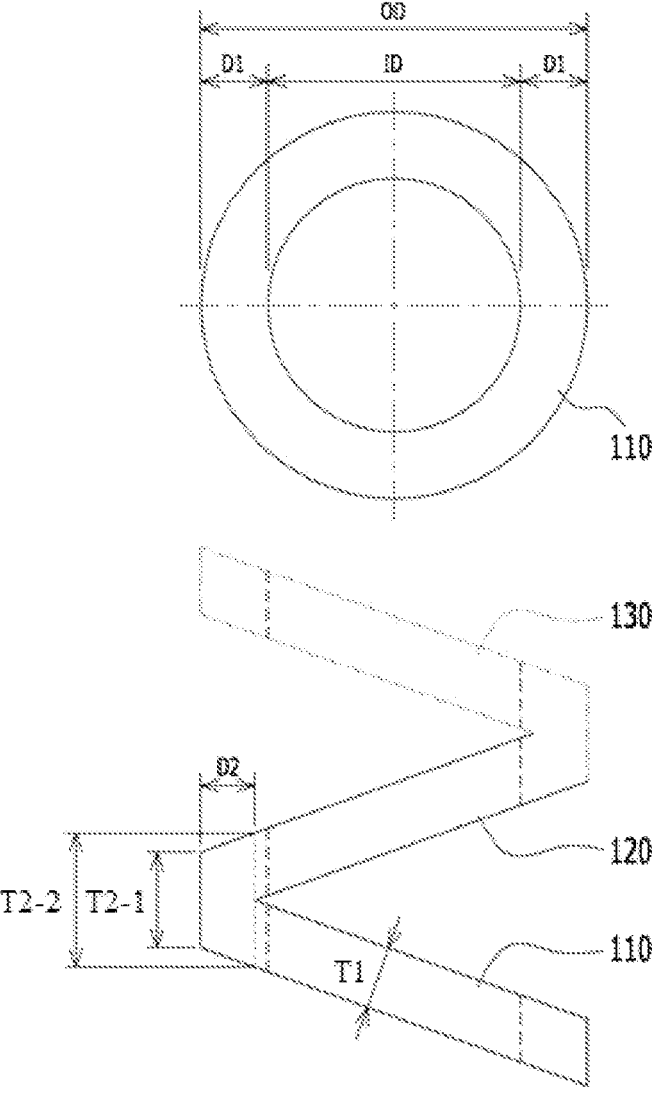

FIG. 5 is a partially enlarged view showing a portion of an elastic member according to an embodiment of the present invention.

Figure 3:
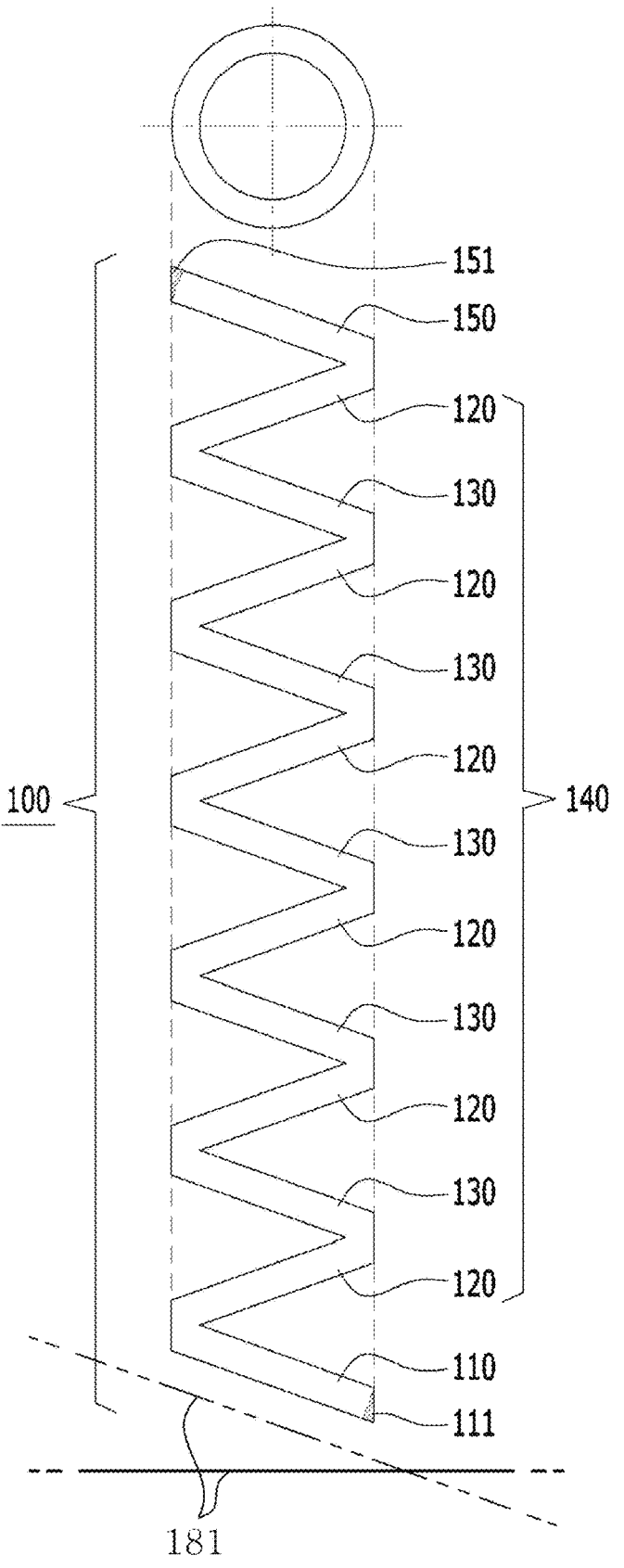
FIG. 3 is a front view showing the elastic member shown in FIG. 2.
Figure 6:
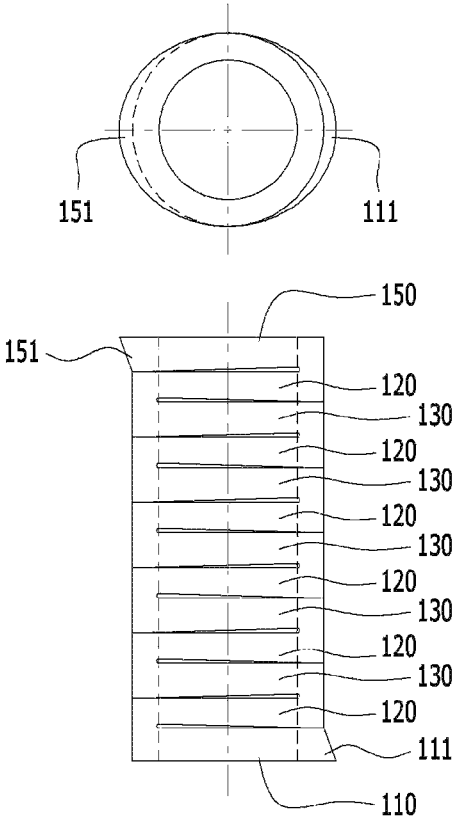

FIG. 6 is a front view illustrating a state in which the elastic member shown in FIG. 3 is compressed by an external force.

Figure 7:
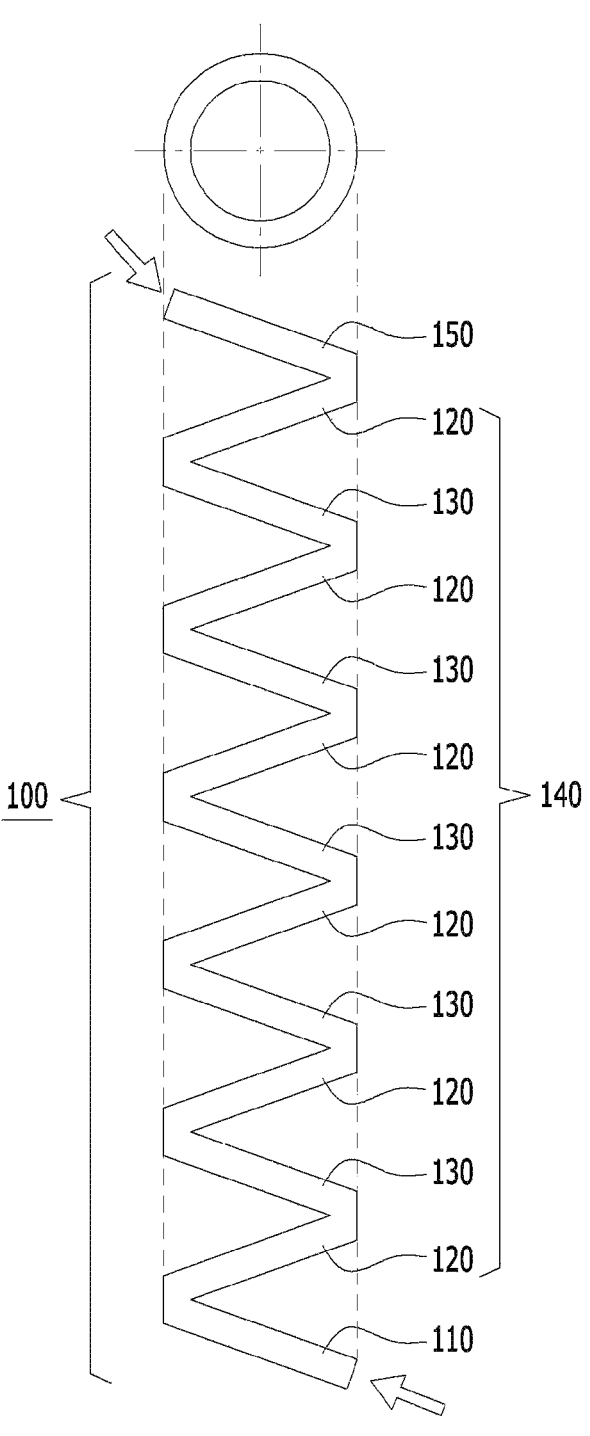

FIG. 7 is a front view showing an elastic member according to another embodiment of the present invention.

Figure 8:
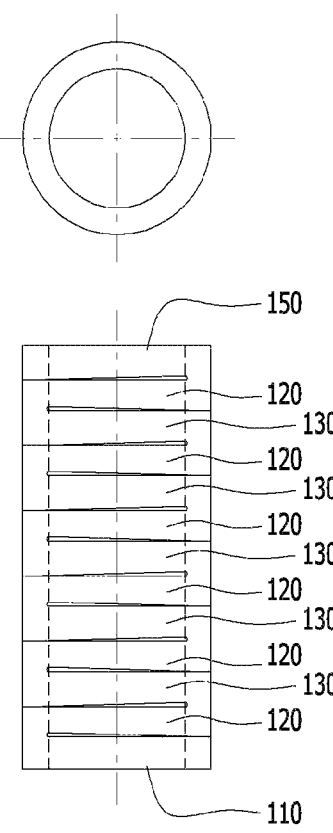

FIG. 8 is a front view illustrating a state in which the elastic member shown in FIG. 7 is compressed by an external force.

Figure 9:
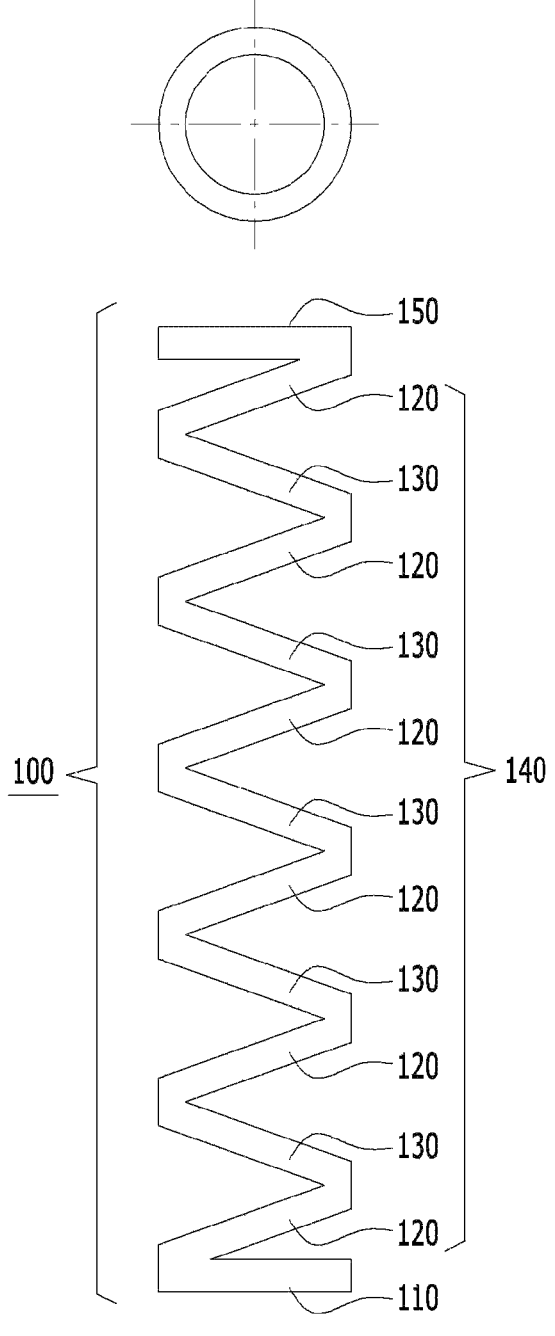

FIG. 9 is a front view showing an elastic member according to another embodiment of the present invention.

Figure 10:
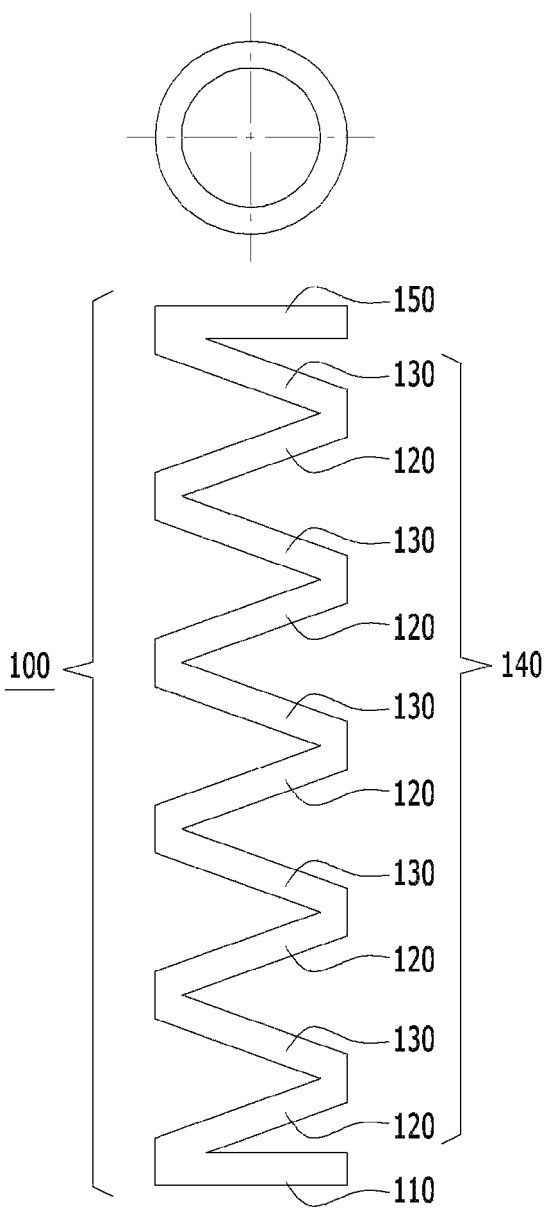

FIG. 10 is a front view showing an elastic member according to another embodiment of the present invention.

Figure 11:
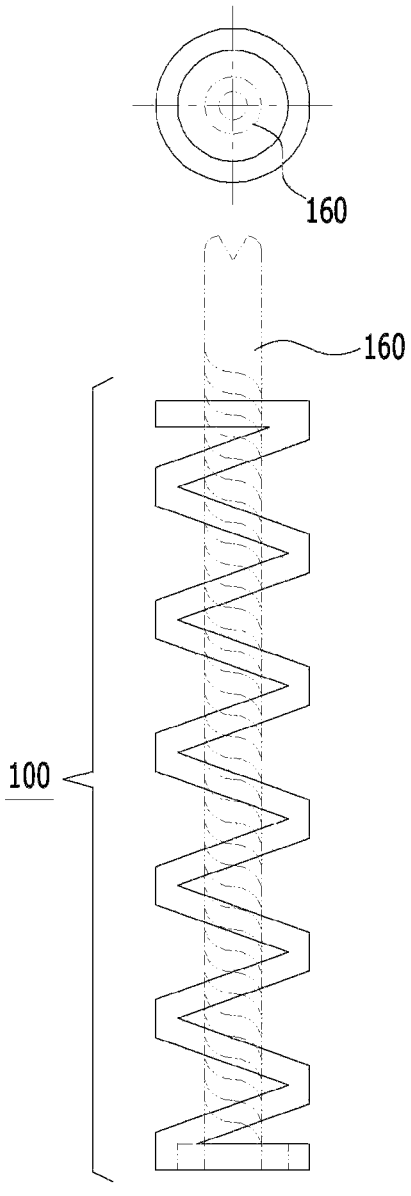

FIG. 11 is a front view showing an elastic member according to another embodiment of the present invention.

Figure 12:
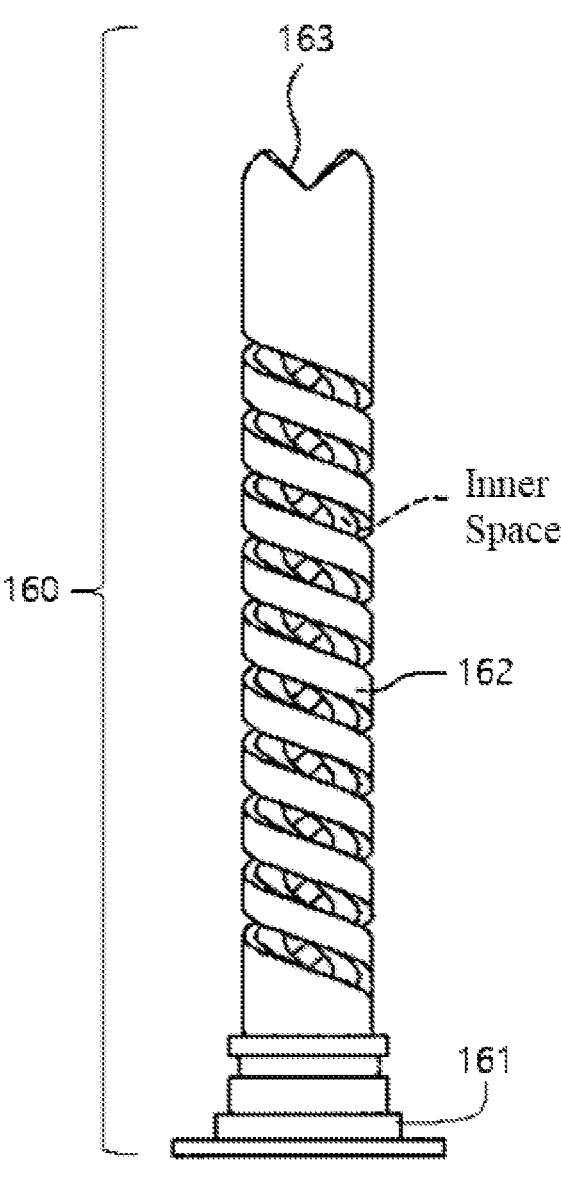
Figure 13:
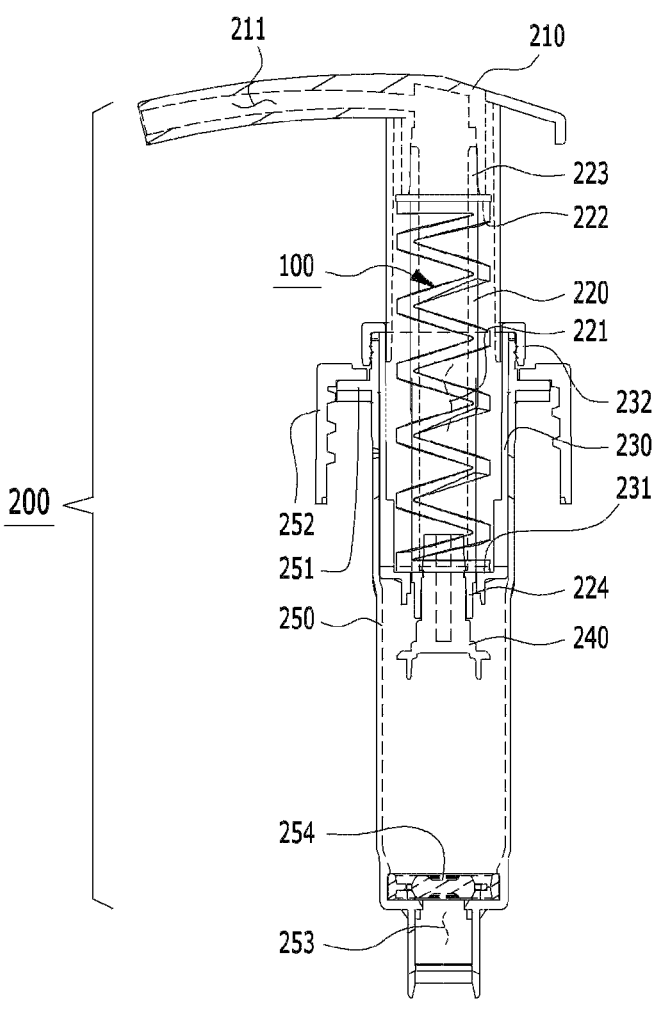

FIG. 12 is a front view illustrating the auxiliary elastic member shown in FIG. 11;

FIG. 13 is a front view showing a cosmetic container pump according to an embodiment of the present invention.

Figure 14:
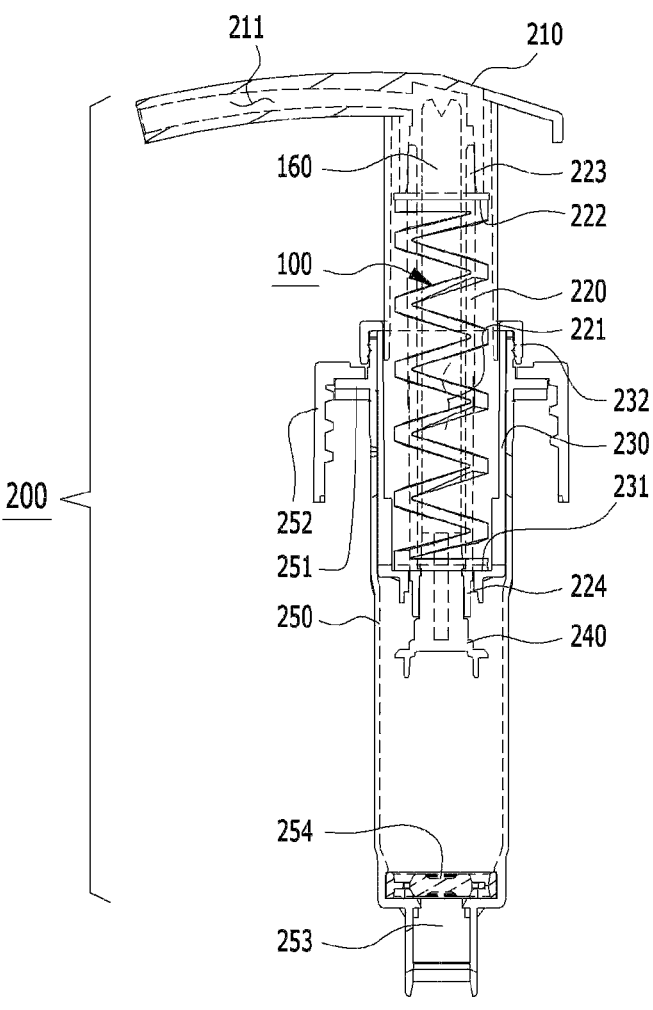

FIG. 14 is a front view showing a cosmetic container pump according to another embodiment of the present invention.

DETAILED DESCRIPTION

Most Preferred Embodiments of the Invention

Hereinafter, preferred embodiments of the present invention will be described in detail with reference to the drawings. Prior to this, terms or words used in this specification and claims should not be construed as being limited to ordinary or dictionary meanings, but should be interpreted as meanings and concepts consistent with the technical spirit of the present invention.

Throughout this specification, when a member is said to be located "on" another member, this includes not only a case where a member is in contact with another member, but also a case where another member exists between the two members. Throughout this specification, when a certain component is said to "include", it means that it may further include other components without excluding other components unless otherwise stated.

Figure 1:
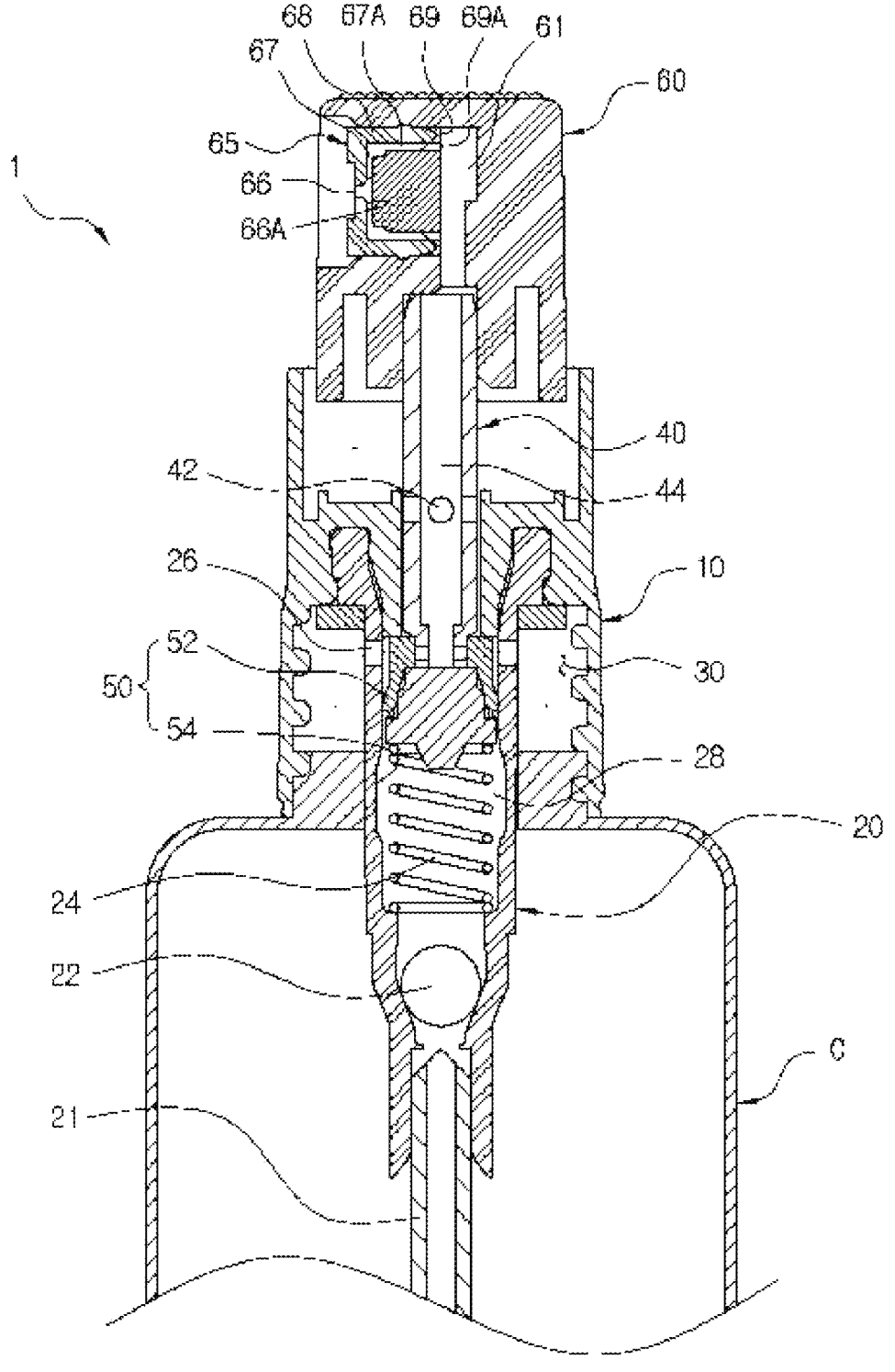
FIG. 1 is a cross-sectional view illustrating a cosmetic pump structure according to prior art.
Figure 2:
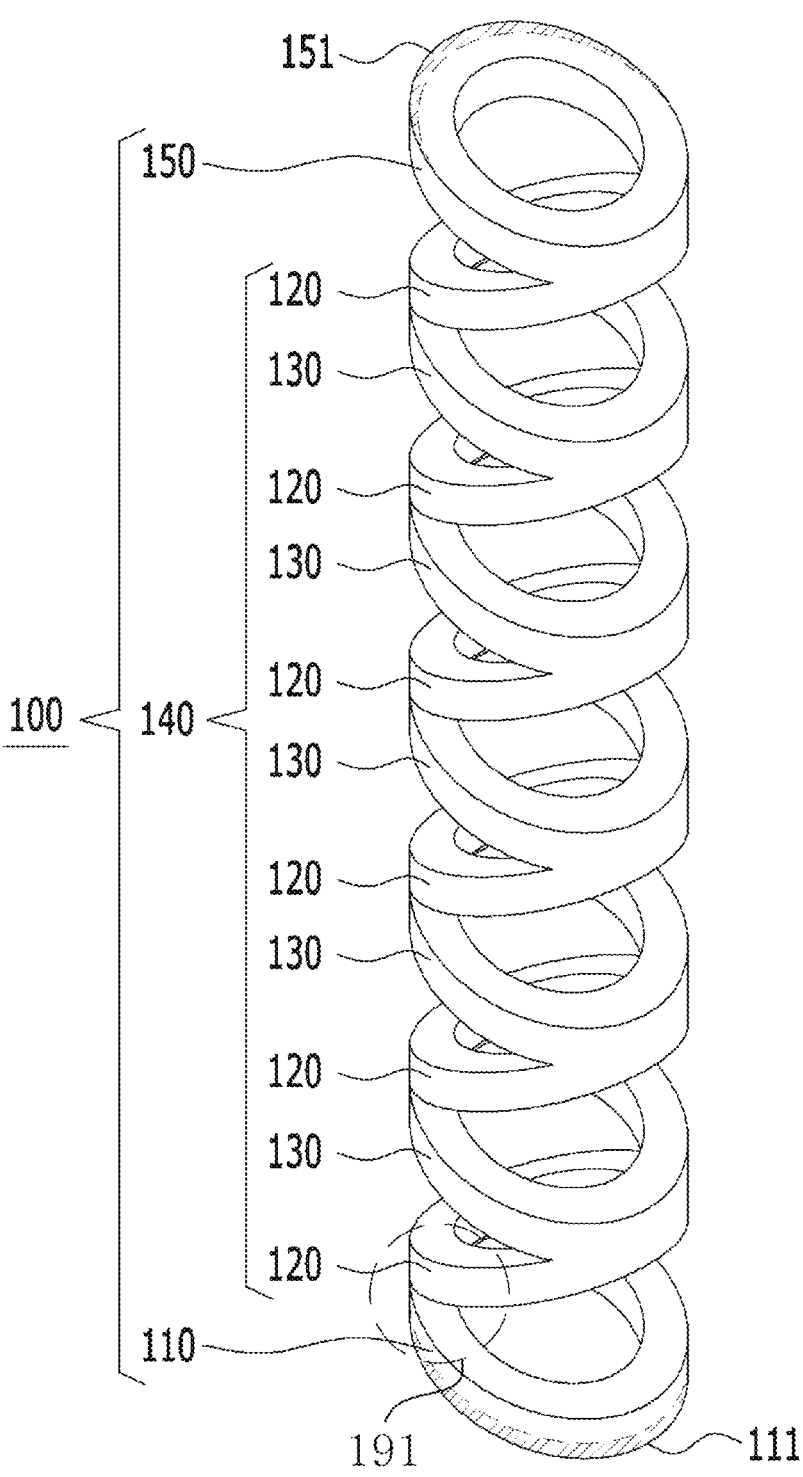
FIG. 2 is a perspective view showing an elastic member according to an embodiment of the present invention.

FIG. 2 is a perspective view showing an elastic member according to an embodiment of the present invention.

Referring to FIG. 2, the elastic member 100 according to the present embodiment may include a lower support portion 110, a first resilient portion 120, a second resilient portion 130 and an elastic structure forming unit 140, all of which have specific structures, whereby a pumping operation of a pumping device can be smoothly induced; a flow of fluid flowing by the pumping operation can be induced in one direction; and a resilient restoring force does not change according to use to thus secure a predetermined pumping discharge amount of the pumping device.

Hereinafter, individual components constituting the elastic member 100 according to the present embodiment will be described in detail with reference to the drawings.

Figure 4:
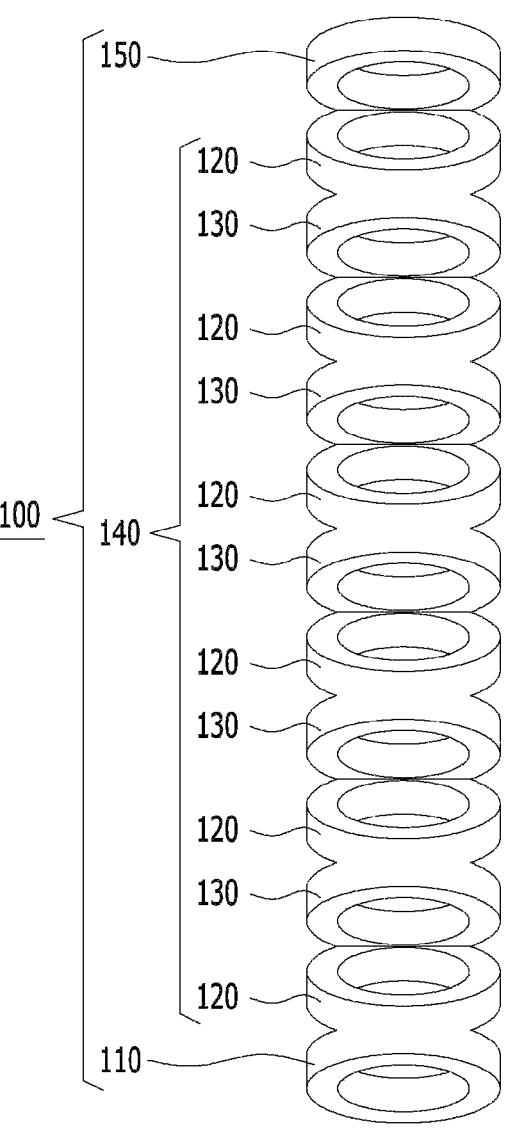
FIG. 4 is a left side view showing the elastic member shown in FIG. 2.

FIG. 3 is a front view showing the elastic member shown in FIG. 2, FIG. 4 is a left side view showing the elastic member shown in FIG. 2, and FIG. 5 is a partially enlarged view showing a portion of the elastic member according to an embodiment of the present invention. Further, FIG. 6 is a front view illustrating a state in which the elastic member shown in FIG. 3 is compressed by an external force.

Referring to these drawings, the lower support portion 110 according to the present embodiment may be a ring structure having predetermined sizes of outer diameter and thickness from a plane view, and may be composed of a plastic material (PP, Polypropylene) having a predetermined level of resilient restoring force.

The first resilient portion 120 may be configured to be bound to the lower support portion 110 or one side of the second resilient portion 130 in an integral construction, wherein it is bound to have a bottom surface forming a predetermined acute angle with the lower support portion 110 or a top surface of the second resilient portion 130. At this time, the first resilient portion 120 may be a ring structure having the same outer diameter and thickness as the lower support portion 110 from the plane view, and is preferably composed of a plastic material (PP, Polypropylene) having a predetermined level of resilient restoring force ("predetermined resilient restoring force").

The second resilient portion 130 may be configured to be bound to the other side of the first resilient portion 120 in an integrated construction, wherein a position of the second resilient portion bound to the other side of the first resilient portion 120 is in a direction at the opposite side of a position where the lower support portion 110 and the first resilient portion 120 are bound to each other from the plane view, and wherein the second resilient portion is bound to have a bottom surface forming a predetermined acute angle with the top surface of the first resilient portion 120. At this time, the second resilient portion 130 may be a ring structure having the same outer diameter and thickness as the first resilient portion 120 from the plane view, and is preferably composed of a plastic material (PP, Polypropylene) having a predetermined resilient restoring force.

In this case, as shown in FIGS. 2 to 4, the first resilient portions 120 and the second resilient portions 130 according to the present embodiment may be continuously bound in turn and may form an elastic structure forming unit 140 to produce a single elastic binding structure.

The upper support portion 150 may be a component that is integrally bound to one side or the other side of the component disposed at the uppermost part ('top') among the first resilient portions 120 and the second resilient portions 130 to form the elastic structure forming unit 140, and may be bound to have a bottom surface forming a predetermined acute angle with the top surface of the uppermost component. At this time, the upper support portion 150 may be a ring structure having the same outer diameter and thickness as the lower support portion 110 from the plane view, and is preferably composed of a plastic material (PP, Polypropylene) having a predetermined resilient restoring force.

In this case, according to the present embodiment, the lower support portion, the first resilient portion 120, the second resilient portion 130 and the upper support portion 150 may be all made of plastic material (PP, Polypropylene), therefore, it is possible to provide an elastic member that can basically inhibit contamination of cosmetics caused by metal corrosion due to direct contact between metal materials and the cosmetics to be applied to the human skin. Furthermore, it is possible to provide an elastic member that may be applied to food treatment devices such as a food processing device and a food packaging device to basically block food contamination so as to implement hygienic food processing, thereby fundamentally solving the problems of the prior art due to the use of a metal elastic member.

As shown in FIG. 5, a longitudinal cross-sectional construction of the lower support portion 110 according to this embodiment may be a polygonal structure formed by a combination of vertical lines and horizontal lines.

Specifically, a height direction thickness T1 on the longitudinal cross-section of the lower support portion 110 may be a length of 10 to 20% compared to an outer diameter (OD) thereof, and a width D1 of each of one side and the other side on the longitudinal cross-section of the lower support portion 110 is preferably a length of 10 to 20% compared to the outer diameter (OD).

On the other hand, a height direction thickness T2 of a binding part 191 where one side of the lower support portion 110 and the first resilient portion 120 are bound to each other may be a length of 150 to 180% compared to the height direction thickness T1 on the longitudinal cross-section of the lower support portion 110. Further, a width D2 of the binding part 191 where the one side of the lower support portion 110 and the first resilient portion 120 are bound to each other is preferably a length of 80 to 100% compared to the height direction thickness T1 on the longitudinal cross-section of the lower support portion 110.

In this case, with regard to the first resilient portion 120, the second resilient portion 130 and the upper support portion 150, respectively, the height direction thickness on the longitudinal cross-section, the width of each of one side and the other side on the longitudinal cross-section, the height direction thickness of a part bound to other components, and the width of the part bound to other components are preferably the same as those of the lower support portion 110.

In this regard, according to the present embodiment, the thickness and width on the longitudinal cross-section of each of the lower support portion 110, the first resilient portion 120, the second resilient portion 130, and the upper support portion 150, as well as the height direction thickness and width of the part bound to other components, may be organically and limitedly defined to specific ranges with reference to a planar outer diameter (OD) of the lower support portion 110, therefore, it is possible to provide an elastic member that can secure structural stability and, at the same time, acquire a specific extent or more of resilient restoring force.

As shown in FIGS. 2, 3 and 6, the elastic member 100 according to the present embodiment may further include protrusion structures protruding laterally on the lower support portion 110 and the upper support portion 150, respectively.

Specifically, at one end of the lower support portion 110, a lower support protrusion 111 may protrude in a lateral direction by a predetermined length. The lower support protrusion 111 may form a vertical side structure parallel to the side surfaces of the first resilient portion 120 and the second resilient portion 130 in a state in which no compressive force is applied to the elastic member.

Further, at one end of the upper support portion 150, an upper support protrusion 151 may protrude in a lateral direction by a predetermined length. The upper support protrusion 151 may form a vertical side structure parallel to the side surfaces of the first resilient portion 120 and the second resilient portion 130 in a state in which no compressive force is applied to the elastic member.

In this case, according to the present embodiment, since the lower support protrusion 111 and the upper support protrusion 151 in specific structures are formed at specific positions, these may be stably disposed on the bottom surface and top surface on which the elastic member is mounted, and may prevent the elastic member from rotating in place by unintended external force, whereby an elastic member capable of stably providing a resilient restoring force against head pressing operation by a user can be provided.

FIG. 7 is a front view showing an elastic member according to another embodiment of the present invention, and FIG. 8 is a front view illustrating a state in which the elastic member shown in FIG. 7 is compressed by an external force.

Referring to these drawings, in the lower support portion 110 and the upper support portion 150 of the elastic member 100 according to the embodiment of the present invention, laterally protruding structures (see 111, 151 in FIG. 6) may be omitted (Arrow in FIG. 7, comparison of FIG. 6 and FIG. 8). Specifically, when a compressive force is applied to the elastic member 100 and the elastic member 100 is compressed up and down, that is, in a vertical direction, it is possible to form a planar structure in which side structures are continued in the vertical direction as shown in FIG. 8. In this case, the elastic member 100 according to the present embodiment can be stably inserted into and mounted in a cylindrical groove.

FIG. 9 is a front view showing an elastic member according to another embodiment of the present invention, and FIG. 10 is a front view showing an elastic member according to another embodiment of the present invention.

Referring to these drawings, the lower support portion 110 and the upper support portion 150 according to this embodiment may be formed parallel to a mounting surface 181 on which these support portions are mounted.

At this time, a component bound to the bottom of the upper support portion 150 may be the first resilient portion 120 or the second resilient portion 130. That is, the first resilient portion 120 and the second resilient portion 130 constituting the elastic structure forming unit 140 may be configured in various combinations according to the designer's intention.

FIG. 11 is a front view showing an elastic member according to another embodiment of the present invention, and FIG. 12 is a front view showing an auxiliary elastic member shown in FIG. 11. Further, FIG. 13 is a front view showing a cosmetic container pump according to an embodiment of the present invention, and FIG. 14 is a front view showing a cosmetic container pump according to another embodiment of the present invention.

Referring to these drawings, the elastic member 100 according to the present embodiment may further include an auxiliary elastic member 160 mounted on an inner space of the elastic structure forming unit 140.

Specifically, the auxiliary elastic member 160 according to the present embodiment may be configured to be compressed in conjunction with the compression of the elastic member to fill the inner space of the elastic member, and may have a specific construction of a lower mounting portion 161, a curved surface forming part 162, and an upper mounting portion 163.

The lower mounting portion 161 of the auxiliary elastic member 160 may be an annular structure having the same outer diameter as the inner circumferential surface of the lower supporting portion 110 and including a through-hole formed in the center thereof. The curved surface forming part 162 may have a configuration of protruding upward by a predetermined height from the lower mounting part 161, may rotate with respect to a vertical central axis of the lower mounting portion 161, may form a curved structure in the form of screw that continuously twists and goes upward, and may be composed of a material having a resilient restoring force in a predetermined extent Further, the upper mounting portion 163 may be configured to be formed as an integral structure at an upper end of the curved surface forming part 162, and may extend upward by a predetermined height and have an uneven (convex-concave) binding structure formed on the top surface thereof.

More specifically, the outer circumferential surface of the curved surface forming part 162 of the auxiliary elastic member 160 according to the present embodiment is preferably a vertical side structure parallel to the inner circumferential surfaces of the first resilient portion 120 and the second resilient portion 130.

As shown in FIG. 13, the cosmetic container pump 200 according to this embodiment may have a configuration of mounting the elastic member 100 of the present invention between an elastic member top fixing groove 222 and an elastic member bottom fixing groove 231.

The cosmetic container pump 200 according to this embodiment may have a configuration including a head 210, a shaft 220, a chaplet 230, a stem 240 and a binding cylinder 250 in specific structures.

Specifically, the head 210 of the cosmetic container pump 200 may be configured to be bound to an upper end of the shaft 220, and may be provided with a discharge passage 211 to discharge liquid cosmetics supplied through a flow-path 221 of the shaft 220 to the outside.

The shaft 220 may have the flow-path 221 formed at an inner center thereof, wherein the elastic member top fixing groove 222 is formed to surround the upper outer circumferential surface of the flow-path 221; and a head fastening part 223 is formed at an upper end while a stem fastening part 224 is formed at a lower end, and the shaft may be driven to slide up and down along the inside of the binding cylinder 250 when a user presses the head 210. At this time, the stem 240 may be mounted at the lower end of the shaft 220 in a structure communicating with the flow-path 221.

The chaplet 230 may have a cylindrical structure surrounding the outer circumferential surface of the shaft 220, and may be provided with the elastic member bottom fixing groove 231 to surround the lower outer circumferential surface of the flow-path 221 in the shaft 220, and may have a cylinder fastening part 232 at the upper end thereof such that the cylinder fastening part is bound to an upper end of the binding cylinder 250.

Further, the binding cylinder 250 may be configured to be bound to the cylinder fastening part 232 of the chaplet 230, and may be a cylindrical structure having an inner space in which the shaft 220 can slide up and down, and may include a flange structure 251 which is provided with a cover 252 at an upper end thereof to be bound to an inlet of the cosmetic container. At this time, at a lower portion of the binding cylinder 250, a suction port 253 to suck liquid cosmetics contained in the cosmetic container may be formed.

In this case, according to the present embodiment, since the auxiliary elastic member 160 including the lower mounting portion 161, the curved surface forming part 162 and the upper mounting portion 163 in specific structures is provided, the auxiliary elastic member 160 may be compressed downward while rapidly reducing an inner space of the head, simultaneously, according to the head pressing operation by the user, whereby the cosmetics filled in the inner space of the auxiliary elastic member 160 inside the head inner space can be discharged to the outside. Therefore, it is possible to provide a cosmetic container pump capable of providing a more increased pumping amount compared to the prior art even when the pumping operation is carried out with the same stroke length as the pumping operation stroke length according to the prior art.

In some cases, the suction port 253 may be provided with a plate-shaped opening and closing ("switch") member 254 having a specific valve structure to open or close the suction port 253 by a pressure difference inside the flow-path 221 formed by the vertical sliding drive of the shaft 220.

In this case, according to the present embodiment, by mounting the plate-shaped switch member 254 in a specific valve structure to open or close the suction port, it is possible to provide a cosmetic container pump capable of basically preventing the flow of liquid cosmetics due to unintended movement of beads in the cosmetic container pump equipped with the bead-shaped switch member according to the prior art.

In the above detailed description of the present invention, only specific embodiments thereof have been described. However, it should be understood that the present invention is not limited to the particular forms mentioned in the detailed description, but rather it should be understood to include all modifications, equivalents and substitutes within the spirit and scope of the present invention as defined by the appended claims.

In other words, the present invention is not limited to the afore-mentioned specific embodiments and descriptions, anyone having ordinary knowledge in the technical field to which the present invention belongs can make various modifications without departing from the gist of the present invention claimed in the claims, and such variations fall within the protection scope of the present invention.

Mode for Carrying Out the Invention

Modes for carrying out the invention have been described together in the most preferred embodiments of the invention above.

INDUSTRIAL APPLICABILITY

The present invention relates to an elastic member having a structure for smoothly inducing pumping of a pumping device and the pumping device including the same, specifically, the elastic member which includes a lower support portion, a first resilient portion, a second resilient portion, an elastic structure forming unit and an upper support portion, all of which have specific structures, whereby a pumping operation of a pumping device can be smoothly induced, a flow of fluid flowing by the pumping operation can be induced in one direction, and a resilient restoring force does not change according to use to thus secure a predetermined pumping discharge amount of the pumping device. Accordingly, the elastic member of the present invention possibly involves industrial applicability.

What is claimed is:

1. An elastic member, comprising:
a lower support portion 110 in a ring structure having predetermined outer diameter and thickness from a plane view, which is made of a plastic material having a predetermined resilient restoring force;
a first resilient portion 120 integrally bound to the lower support portion 110 or one side of a second resilient portion 130, the binding being implemented to have a bottom surface that forms a predetermined acute angle with the lower support portion 110 or a top surface of the second resilient portion 130, which has a ring structure with the same outer diameter and thickness as the lower support portion 110 from the plane view, and is made of a plastic material having a predetermined resilient restoring force;

12 the second resilient portion 130 integrally bound to the other side of the first resilient portion 120 wherein a binding position to the other side of the first resilient portion 120 is in a direction at the opposite side of a position where the lower support portion 110 and the first resilient portion 120 are bound to each other from the plane view, the binding being implemented to have a bottom surface that forms a predetermined acute angle with the top surface of the first resilient portion 120, which has a ring structure with the same outer diameter and thickness as the first resilient portion 120 from the plane view, and is made of a plastic material having a predetermined resilient restoring force;

an elastic structure forming unit 140 in which the first resilient portions 120 and the second resilient portions 130 are continuously and alternately bound to form a single elastic binding structure; and an upper support portion 150 integrally bound to one side or the other side of an uppermost component among the first resilient portions 120 and the second resilient portions 130 that form the elastic structure forming unit, the binding being implemented to have a bottom surface that forms a predetermined acute angle with a top surface of the uppermost component, which has a ring structure with the same outer diameter and thickness as the lower support portion 110 from the plane view, and is made of a plastic material having a predetermined resilient restoring force, wherein the lower support portion 110 and the upper support portion 150 are configured to form a predetermined angle with a mounting surface 181 on which these are mounted, or are configured parallel to the mounting surface 181 on which these are mounted, a longitudinal cross-sectional structure of the lower support portion 110 is a polygonal structure formed by a combination of vertical lines and horizontal lines, a thickness (T1) in a height direction on a longitudinal cross-section of the lower support portion 110 is a length of 10 to 20% compared to the outer diameter (OD), while a width (D1) of each of one side and the other side on the longitudinal cross-section of the lower support portion 110 is a length of 10 to 20% compared to the outer diameter (OD), a thickness (T2) in a height direction of a binding part 191 where the one side of the lower support portion 110 and the first resilient portion 120 are bound to each other is a length of 150 to 180% compared to the thickness (T1) in the height direction on the longitudinal cross-section of the lower support portion 110, while a width (D2) in the height direction of the binding part 191 where the one side of the lower support portion 110 and the first resilient portion 120 are bound to each other is a length of 80 to 100% compared to the thickness (T1) in the height direction on the longitudinal cross-section of the lower support portion 110, wherein the thickness in the height direction on the longitudinal cross-section of each of the first resilient portion 120, the second resilient portion 130 and the upper support portion 150, the width of each of one side and the other side on the longitudinal cross-section, the thickness in the height direction of the part bound to another component, and the width of the part bound to another component, respectively, are the same as those of the lower support portion 110.

2. The elastic member according to claim 1, wherein the elastic member includes:

a lower support protrusion 111 which is formed to protrude laterally by a predetermined length from one end of the lower support portion 110, and is configured to form a vertical side structure parallel to a side surface of the first resilient portion 120 and a side surface of the second resilient portion 130 in a state that no compressive force is applied to the elastic member; and an upper support protrusion 151 which is formed to protrude laterally by a predetermined length from one end of the upper support portion 150, and is configured to form a vertical side structure parallel to the side surface of the first resilient portion 120 and the side surface of the second resilient portion 130 in a state that no compressive force is applied to the elastic member.

3. The elastic member according to claim 1, wherein elastic member further includes:

an auxiliary elastic member 160 with a configuration in that the auxiliary elastic member is mounted in an inner space of the elastic structure forming unit 140, and is compressed in conjunction with the compression of the elastic member to fill the inner space of the elastic member, wherein the auxiliary elastic member 160 includes:

a lower mounting portion 161 with an annular structure having the same outer diameter as an inner circumferential surface of the lower support portion 110 and being provided with a through-hole formed in the central portion;

a curved surface forming part 162, which is formed to protrude upward by a predetermined height from the lower mounting portion 161, forms a curved structure in the form of screw that rotates about a vertical center axis of the lower mounting portion 161 and continuously twists and goes upward, and is made of a material having a predetermined resilient restoring force; and an upper mounting portion 163 that is formed as an integral structure at an upper end of the curved surface forming part 162, extends upward by a predetermined height, and has a concave-convex structure formed on the top surface thereof, wherein an outer circumferential surface of the curved surface forming part 162 in the auxiliary elastic member 160 has a vertical side structure parallel to the inner circumferential surfaces of the first resilient portion 120 and the second resilient portion 130.

4. A cosmetic container pump including the elastic member 100 according to claim 1, which is mounted between an elastic member top fixing groove 222 and an elastic member bottom fixing groove 231, comprising:

a head 210 bound to an upper end of a shaft 220, which is provided with a discharge passage 211 for discharging liquid cosmetics supplied via a flow-path 221 of the shaft 220 to the outside;

the shaft 220 in which the flow-path 221 is formed at an inner center thereof, the elastic member top fixing groove 222 is formed to surround an upper outer circumferential surface of the flow-path 221, and a head fastening part 223 is formed at the upper end while a stem fastening part 224 is formed at the lower end, the shaft being driven to slid up and down along the inside of a binding cylinder 250 when a user presses the head;

a chaplet 230 in a cylindrical structure that surrounds the outer circumferential surface of the shaft 220, is provided with the elastic member bottom fixing groove 231 formed to surround a lower outer circumferential surface of the flow-path 221 of the shaft 220, and has a cylinder fastening part 232 formed at an upper end thereof to be bound to the upper end of the binding cylinder 250;

a stem 240 mounted on the lower end of the shaft 220 in a structure communicating with the flow-path 221;

the binding cylinder 250 in a cylindrical structure that is bound to the cylinder fastening part 232 of the chaplet 230, is formed with a space, in which the shaft 220 can be driven to slide up and down, and is provided with a flange structure 251 at the top thereof, in which a cover 252 bound to an inlet of the cosmetic container is positioned;

a suction port 253 formed at the bottom of the binding cylinder 250 to suck liquid cosmetics stored in the cosmetic container; and a plate-shaped opening/closing member 254 in a valve structure, which is provided in the suction port 253, and opens or closes the suction port 253 by a pressure difference inside the flow-path 221 formed according to vertical sliding drive of the shaft 220.

* * * * *